(12) United States Patent
Ogura

(10) Patent No.: US 11,644,368 B2
(45) Date of Patent: May 9, 2023

(54) TEMPERATURE SENSOR AND DEVICE INCLUDING TEMPERATURE SENSOR

(71) Applicant: SEMITEC Corporation, Tokyo (JP)

(72) Inventor: Mitsutoshi Ogura, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 276 days.

(21) Appl. No.: 16/758,393

(22) PCT Filed: Oct. 15, 2018

(86) PCT No.: PCT/JP2018/038303
§ 371 (c)(1),
(2) Date: Apr. 22, 2020

(87) PCT Pub. No.: WO2019/087755
PCT Pub. Date: May 9, 2019

(65) Prior Publication Data
US 2020/0249097 A1    Aug. 6, 2020

(30) Foreign Application Priority Data
Oct. 30, 2017    (JP) .............................. JP2017-209090

(51) Int. Cl.
*G01K 7/22*    (2006.01)

(52) U.S. Cl.
CPC ...................................... *G01K 7/22* (2013.01)

(58) Field of Classification Search
None
See application file for complete search history.

(56) References Cited

U.S. PATENT DOCUMENTS

| 2009/0110029 A1* | 4/2009 | Bradley | A61M 16/024 374/208 |
| 2014/0217289 A1* | 8/2014 | Nam | G01J 5/0818 250/353 |
| 2017/0016777 A1* | 1/2017 | Yoshihara | G01K 7/22 |

FOREIGN PATENT DOCUMENTS

| CN | 104204750 | 12/2014 |
| CN | 105181166 | 12/2015 |

(Continued)

OTHER PUBLICATIONS

"Office Action of China Counterpart Application", dated Jun. 30, 2021, with English translation thereof, pp. 1-12.

(Continued)

*Primary Examiner* — Erica S Lin
(74) *Attorney, Agent, or Firm* — JCIPRNET

(57) ABSTRACT

A temperature sensor and a device are provided, in which the temperature sensor is capable of reducing thickness, increasing a contact area with an object whose temperature is to be measured, and improving measurement accuracy. A temperature sensor is provided with: a thermistor element; a lead-out wire connected to the thermistor element; a lead wire connected to the lead-out wire; an inner layer formed by heating and curing or by melting and solidifying a pair of sheet-like inner layer materials formed of a resin material; and outer layers formed of a pair of sheet-like outer layer materials formed of a resin material and having flat surfaces on both sides. The thermistor element, the lead-out wire, and a connection part between the lead-out wire and the lead wire are covered with the inner layer, and are also covered with the pair of outer layers by being sandwiched therebetween.

10 Claims, 12 Drawing Sheets

(56) References Cited

FOREIGN PATENT DOCUMENTS

| | | |
|---|---:|---:|
| JP | H0854292 | 2/1996 |
| JP | H08110268 | 4/1996 |
| JP | H08128901 | 5/1996 |
| JP | 2004233267 | 8/2004 |
| JP | 2010123641 | 6/2010 |
| JP | 2012068131 | 4/2012 |
| JP | 5830636 | 12/2015 |
| JP | 2017161332 | 9/2017 |
| KR | 20110006209 | 1/2011 |

OTHER PUBLICATIONS

"International Search Report (Form PCT/ISA/210) of PCT/JP2018/038303," dated Jan. 8, 2019, with English translation thereof, pp. 1-3.

Office Action of China Counterpart Application, with English translation thereof, dated Jan. 13, 2022, pp. 1-10.

"Decision of Rejection of China Counterpart Application", dated Jul. 8, 2022, with English translation thereof, p. 1-p. 12.

\* cited by examiner (a)

(b)

(a)

(b)

TEMPERATURE SENSOR AND DEVICE INCLUDING TEMPERATURE SENSOR

CROSS-REFERENCE TO RELATED APPLICATION

This application is a 371 application of the International PCT application serial no. PCT/JP2018/038303, filed on Oct. 15, 2018, which claims the priority benefits of Japan Patent Application No. 2017-209090, filed on Oct. 30, 2017. The entirety of each of the above-mentioned patent applications is hereby incorporated by reference herein and made a part of this specification.

BACKGROUND

Technical Field

The disclosure relates to a temperature sensor and a device including the temperature sensor.

Description of Related Art

For example, a temperature sensor configured with a thermistor element is used to detect the temperature of an electric appliance such as an air conditioner, a refrigerator, a water heater, and an IH cooking heater, and to detect the temperature of a motor coil, a secondary battery and the like of a vehicle-mounted device of an automobile and the like. Such a temperature sensor is required to have durability such as heat resistance, chemical resistance, water resistance, and oil resistance according to the use environments.

Therefore, conventionally, a temperature sensor has been proposed in which a thermistor element and a contact part of a lead-out wire and a lead wire are covered by resin coating layers of an inner layer tube and an outer layer tube, and which is formed to have a rectangular parallelepiped appearance (see Patent Document 1).

However, since this temperature sensor is formed by a double tube including the inner layer tube and the outer layer tube, it is difficult to reduce the thickness, and there is also a problem that it is difficult to form, for example, a curved-surface shape in accordance with the shape of a surface whose temperature is to be measured of an object whose temperature is to be measured or to increase a contact area with the object whose temperature is to be measured.

In addition, there is known a temperature sensor in which a thermosensitive element is disposed between a pair of insulating sheets and attached to the pair of sheets by an adhesive (see Patent Documents 2 and 3).

However, this temperature sensor has a problem that the insulating sheets do not form a double structure including an inner layer and an outer layer, and the thickness of the thermosensitive element protrudes to the outer surface side, so it is difficult for the insulating sheets to be flat.

RELATED ART

Patent Document

Patent Document 1: Japanese Patent No. 5830636
Patent Document 2: Japanese Laid-Open No. H8-54292
Patent Document 3: Japanese Laid-Open No. H8-110268
Patent Document 4: Japanese Laid-Open No. 2004-233267
Patent Document 5: Japanese Laid-Open No. 2010-123641

SUMMARY

Technical Problem

A problem to be solved by the disclosure is to provide a temperature sensor enabling to reduce thickness, increase a contact area with an object whose temperature is to be measured, and improve measurement accuracy; and to provide a device that is including the temperature sensor.

Solution to the Problem

The temperature sensor according to an embodiment of the disclosure includes a thermistor element; a lead-out wire connected to the thermistor element; a lead wire connected to the lead-out wire; an inner layer formed by heating and curing or by melting and solidifying a pair of sheet-like inner layer materials made of a resin material; and outer layers formed by a pair of sheet-like outer layer materials made of a resin material and having flat surfaces on two sides, wherein the thermistor element, the lead-out wire, and a connection part between the lead-out wire and the lead wire are covered by the inner layer and are also covered by the pair of outer layers by being sandwiched therebetween.

According to the disclosure, it is possible to reduce the thickness, increase the contact area with the object whose temperature is to be measured, and improve measurement accuracy.

In the temperature sensor according to an embodiment of the disclosure, a material that reflects infrared rays is disposed on one surface of the outer layers.

In the temperature sensor according to an embodiment of the disclosure, the outer layers are in a flat curved-surface shape, and one surface is in a concave curved-surface shape, and the other surface is in a convex curved-surface shape. According to the disclosure, the temperature detection surface can be brought into contact along the curved-surface shape of the surface of the object whose temperature is to be measured.

In the temperature sensor according to an embodiment of the disclosure, an inner surface side of the outer layers is deformed to form a recess corresponding to the thermistor element. According to the disclosure, it is possible to reduce the thickness and also to prevent the thermistor element from protruding to the outer surface side of the outer layers.

In the temperature sensor according to an embodiment of the disclosure, the temperature sensor has flexibility. According to the disclosure, the temperature detection surface can be deformed and brought into contact along the shape of the surface of the object whose temperature is to be measured to be attached thereto.

In the temperature sensor according to an embodiment of the disclosure, the lead wire is an electric wire covered by an insulating coating. Any one of a single wire, a square wire, a stranded wire, and the like may be applied as a form of the lead wire.

In the temperature sensor according to an embodiment of the disclosure, the outer layers and the inner layer have heat resistance of 200° C. or more.

In the temperature sensor according to an embodiment of the disclosure, the outer layers and the inner layer have oil resistance of 150° C. or more.

In the temperature sensor according to an embodiment of the disclosure, the pair of sheet-like outer layer materials made of the resin material have an identical shape. According to the disclosure, it is possible to share common members.

In the temperature sensor according to an embodiment of the disclosure, a thickness of the inner layer is greater than a thickness of the outer layer.

The device including a temperature sensor according to an embodiment of the disclosure includes the temperature sensor according to an embodiment of the disclosure.

The device including a temperature sensor corresponds to various devices including a temperature sensor for various temperature detection for an electric appliance such as an air conditioner, a refrigerator and a water heater, and for a motor coil, a secondary battery and the like of a vehicle-mounted device of an automobile and the like. Applicable devices with a temperature sensor are not particularly limited.

Effects

According to the embodiments of the disclosure, a temperature sensor enabling to reduce the thickness, increase the contact area with the object whose temperature is to be measured, and improve measurement accuracy, and a device that is including the temperature sensor can be provided.

BRIEF DESCRIPTION OF THE DRAWINGS (a) and (b) of FIG. 1 shows a temperature sensor according to a first embodiment of the disclosure, wherein (a) is a perspective view, and (b) is a side view.

Figure 5:
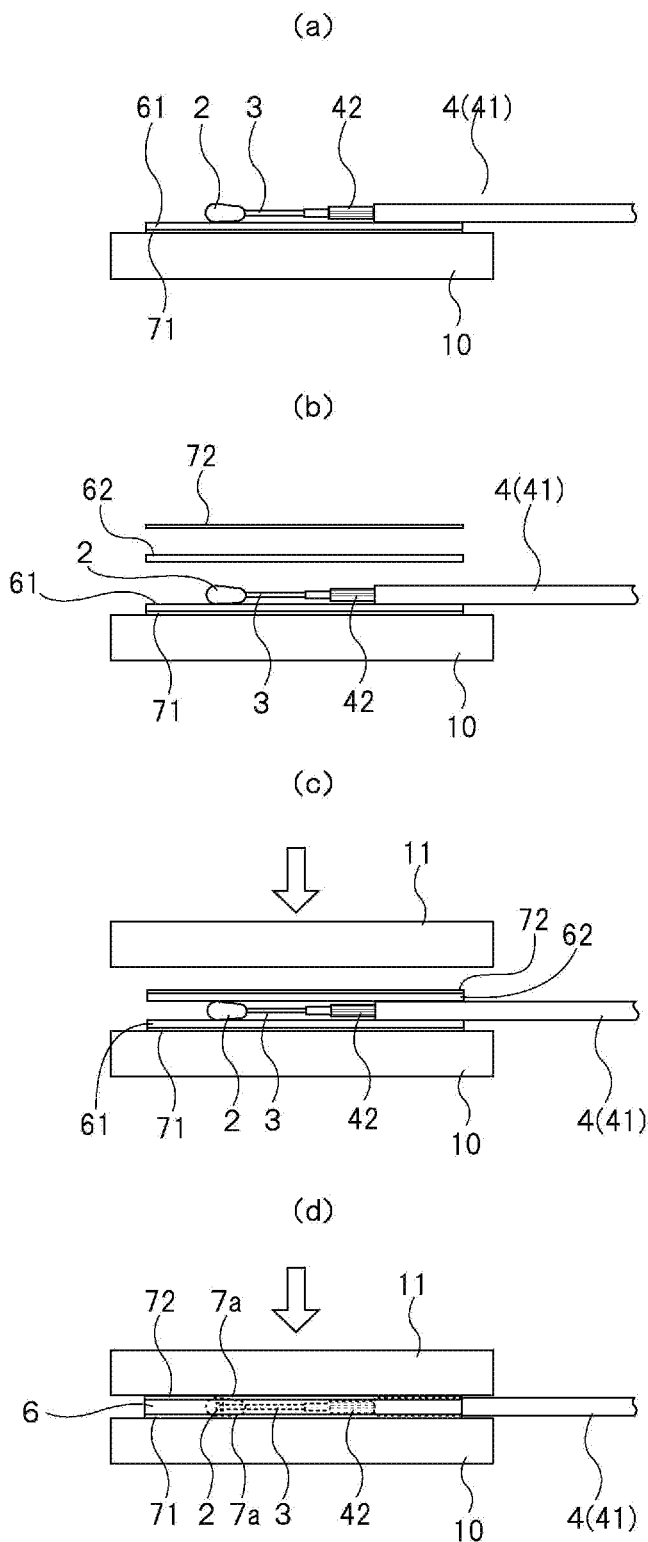

(a) to (d) of FIG. 5 is an illustrative view showing a manufacturing process in the manufacturing method of the temperature sensor.

Figure 6:
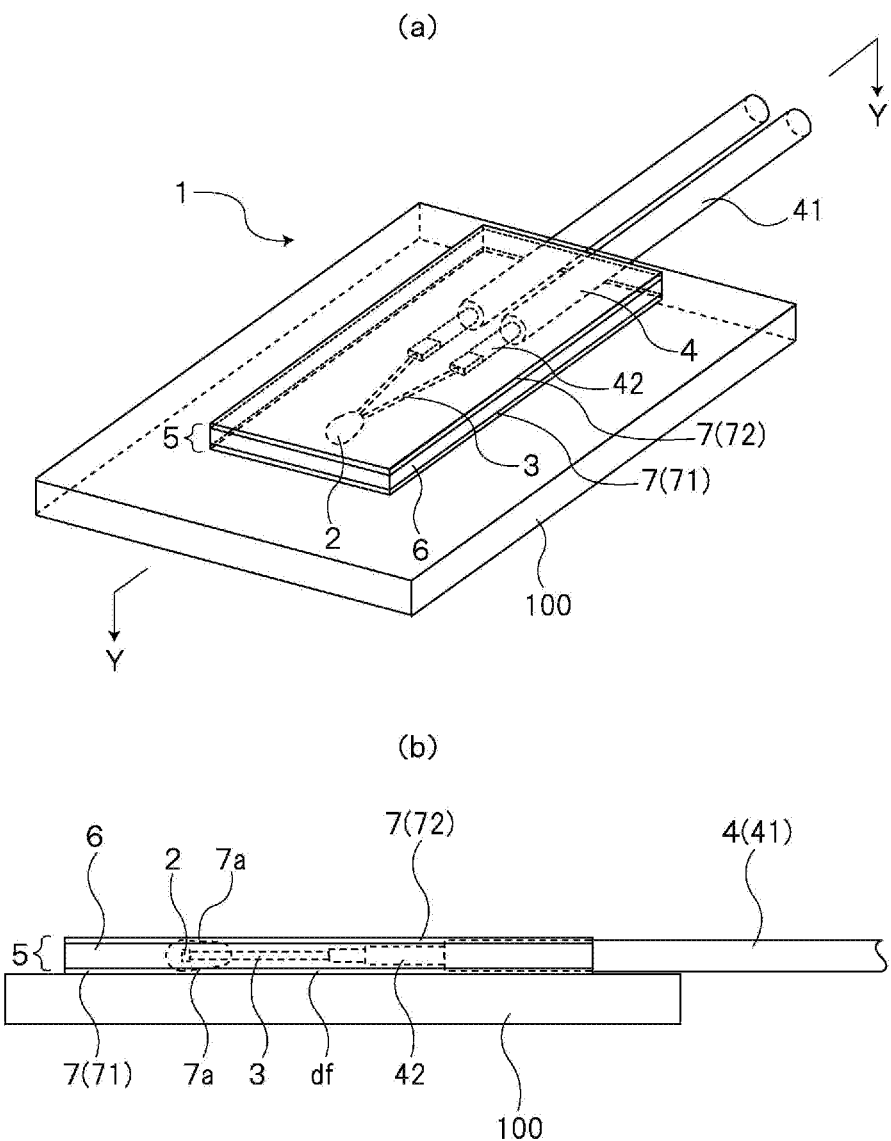

(a) and (b) of FIG. 6 shows a state in which the temperature sensor is disposed on an object whose temperature is to be measured and performs temperature detection, wherein (a) is a perspective view, and (b) is a side view.

Figure 7:
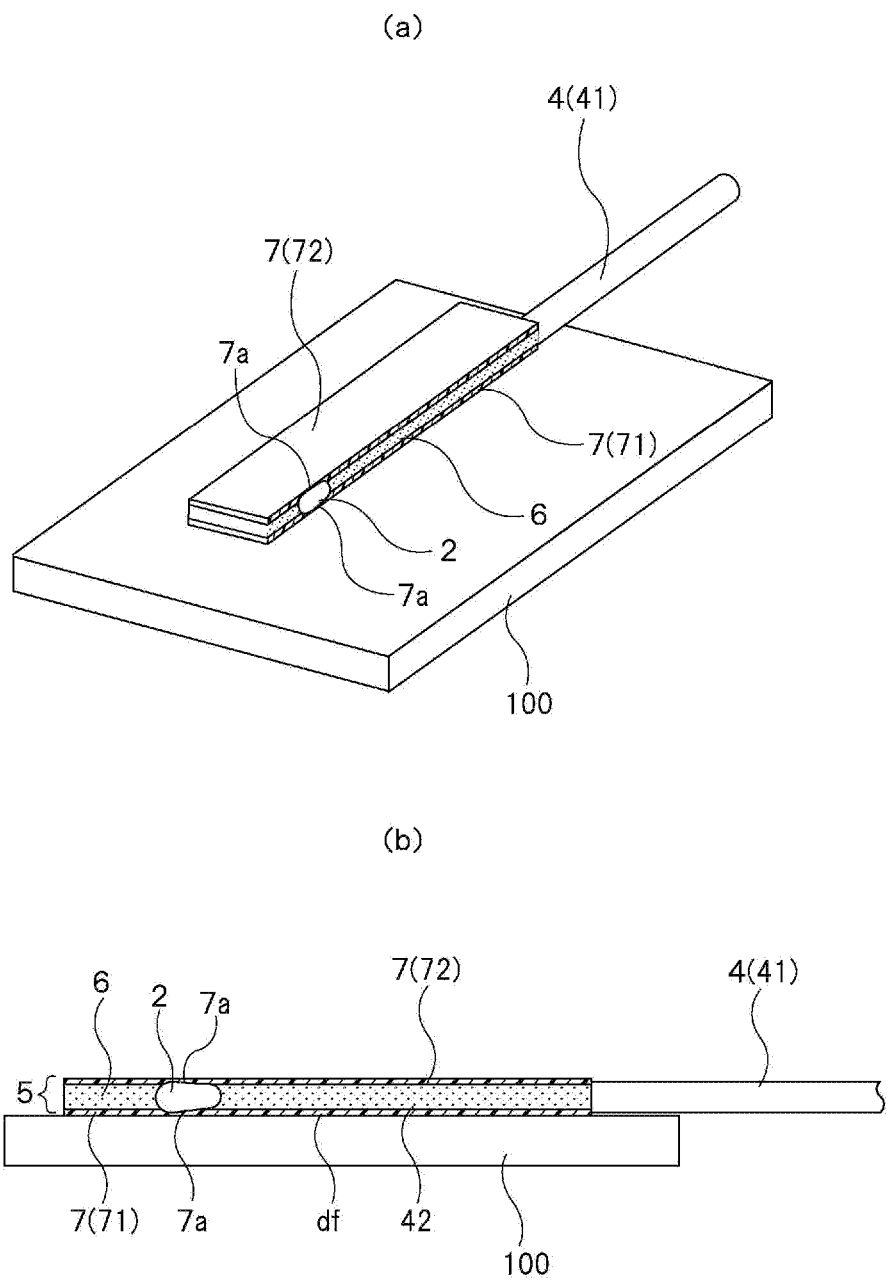

(a) and (b) of FIG. 7 shows a cross section taken along the line Y-Y in (a) of FIG. 6, wherein (a) is a perspective view, and (b) is a side view.

Figure 8:
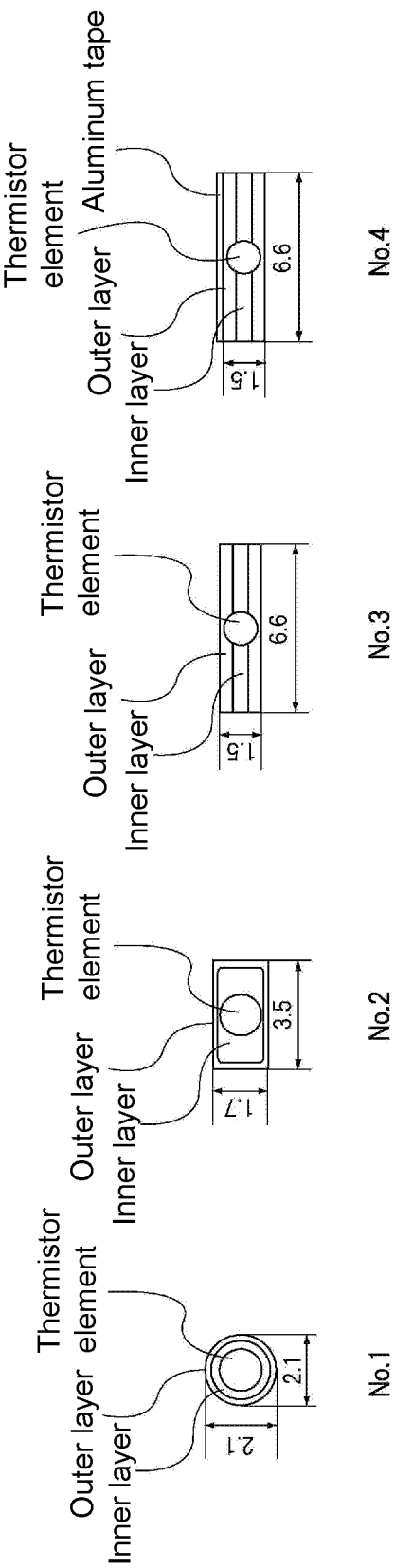

FIG. 8 is a transverse sectional view schematically showing temperature sensors of the embodiments and temperature sensors of comparative examples as temperature-measuring target samples.

Figure 9:
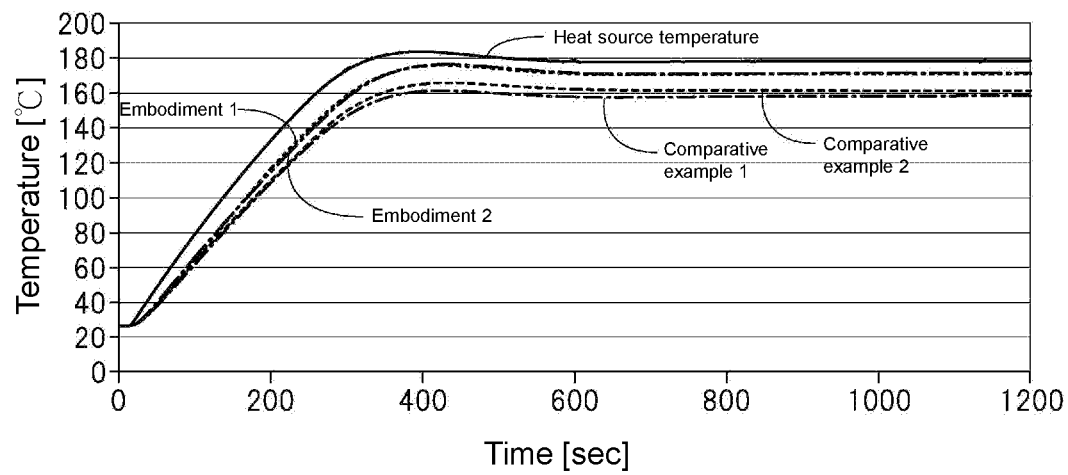

FIG. 9 is a graph showing the temperature of a target whose temperature is to be measured (heat source) and the detection temperature of the temperature sensors.

Figure 10:
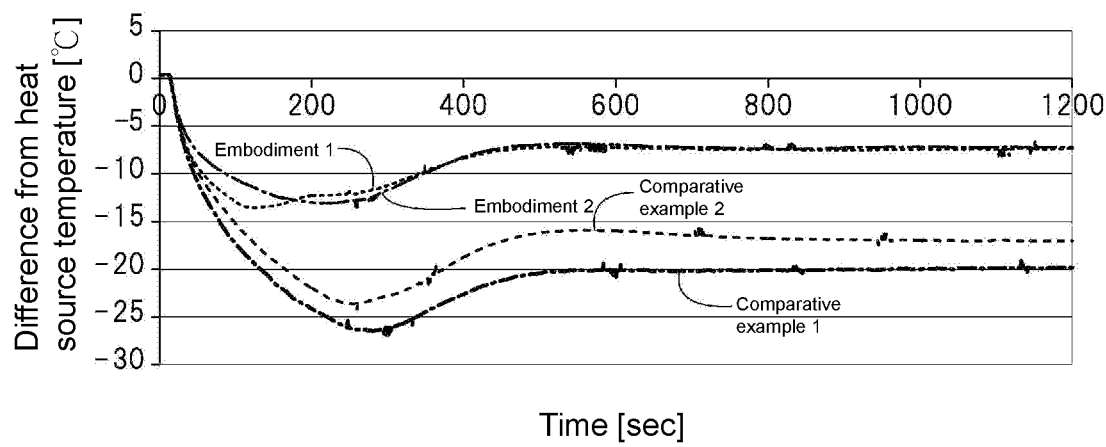

FIG. 10 is a graph showing temperature differences between the temperature of the target whose temperature is to be measured (heat source) and the detection temperature of the temperature sensors.

Figure 11:
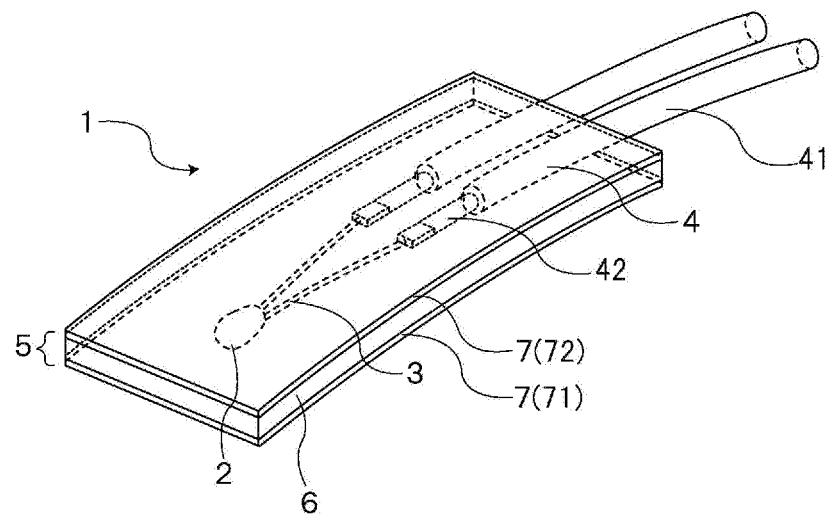
Figure 11:
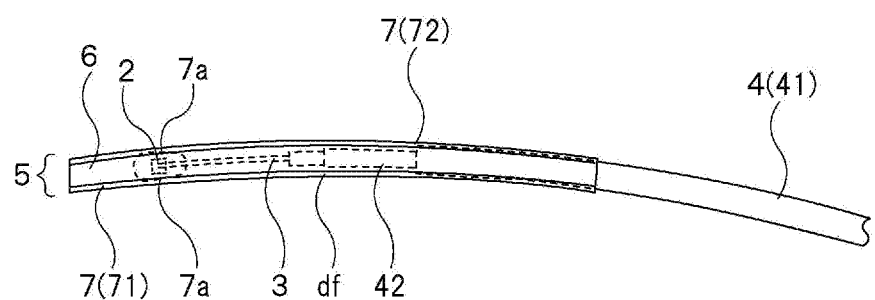

(a) and (b) of FIG. 11 shows a temperature sensor according to a second embodiment of the disclosure, wherein (a) is a perspective view, and (b) is a side view.

Figure 12:
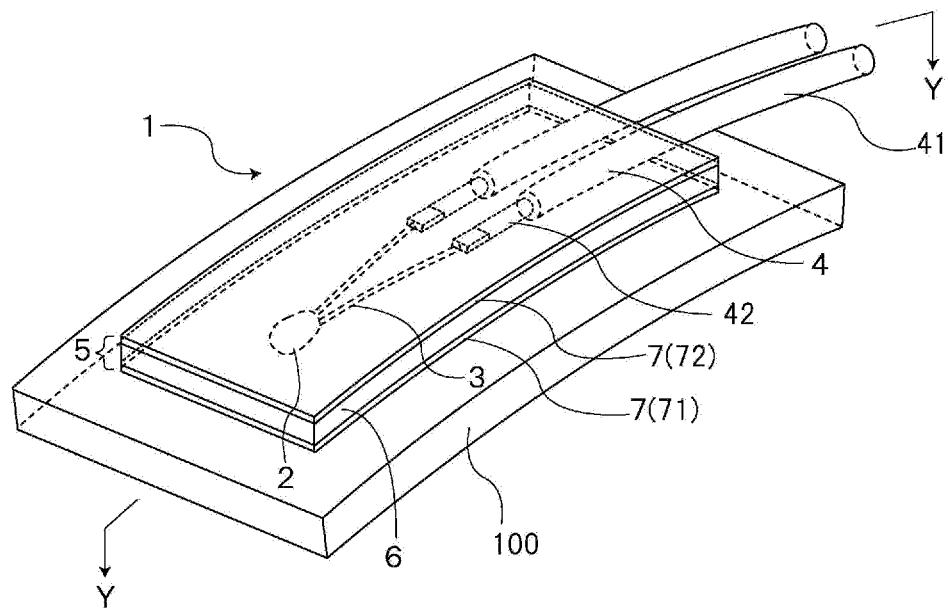
Figure 12:
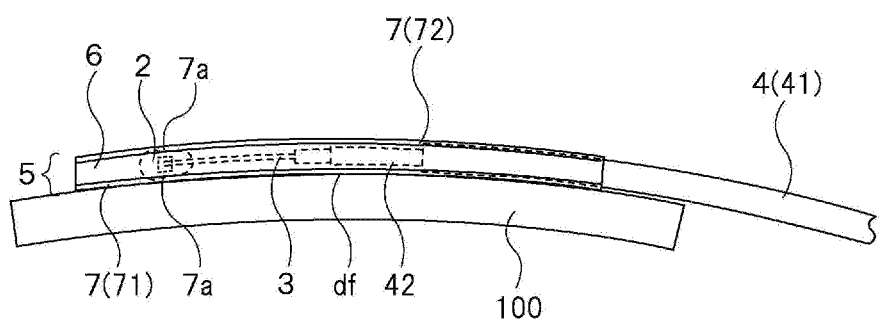

(a) and (b) of FIG. 12 shows a state in which the temperature sensor is disposed on an object whose temperature is to be measured and performs temperature detection, wherein (a) is a perspective view, and (b) is a side view.

Figure 13:
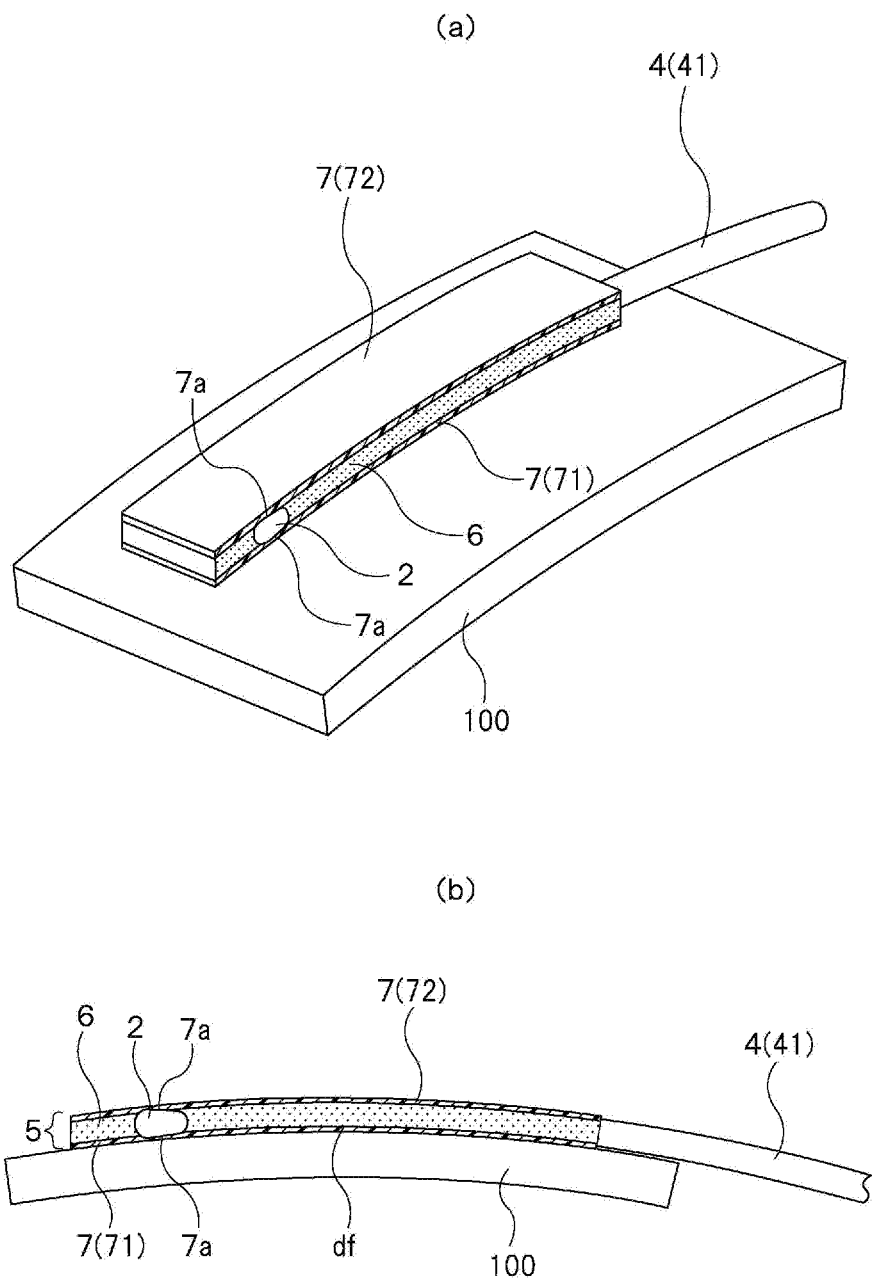

(a) and (b) of FIG. 13 shows a cross section taken along the line Y-Y in (a) of FIG. 12, wherein (a) is a perspective view, and (b) is a side view.

Figure 14:
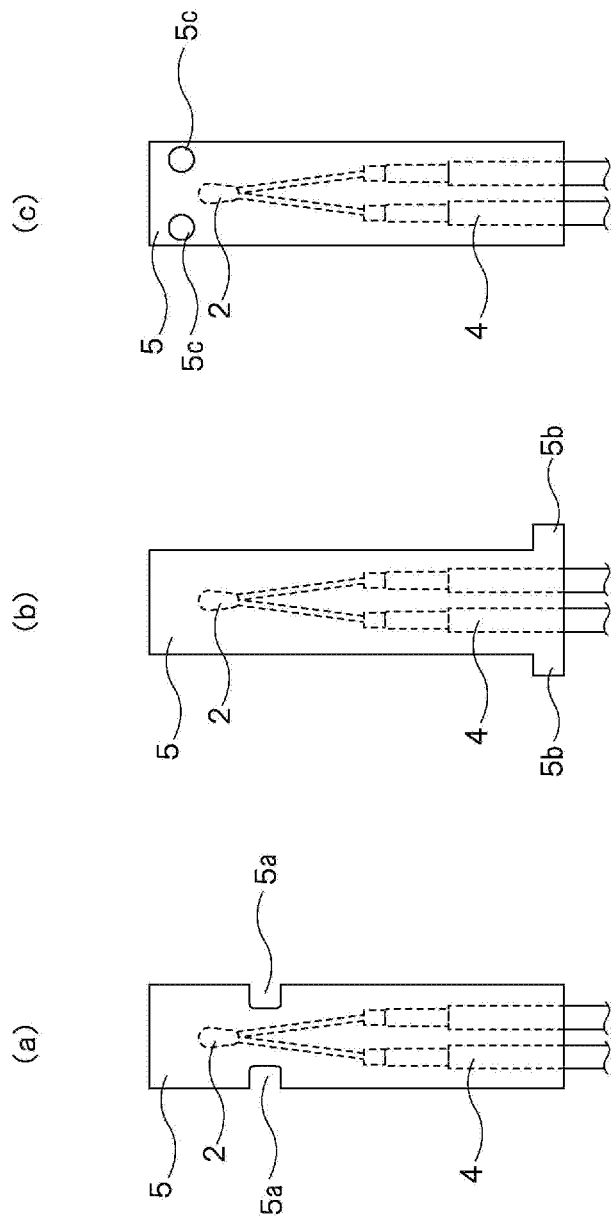

(a) to (c) of FIG. 14 is respectively a plan view showing an embodiment in which an attachment part is formed in the case where the temperature sensor is attached to the object whose temperature is to be measured, wherein (a) shows Example 1, (b) shows Example 2, and (c) shows Example 3.

DESCRIPTION OF THE EMBODIMENTS

Figure 1:
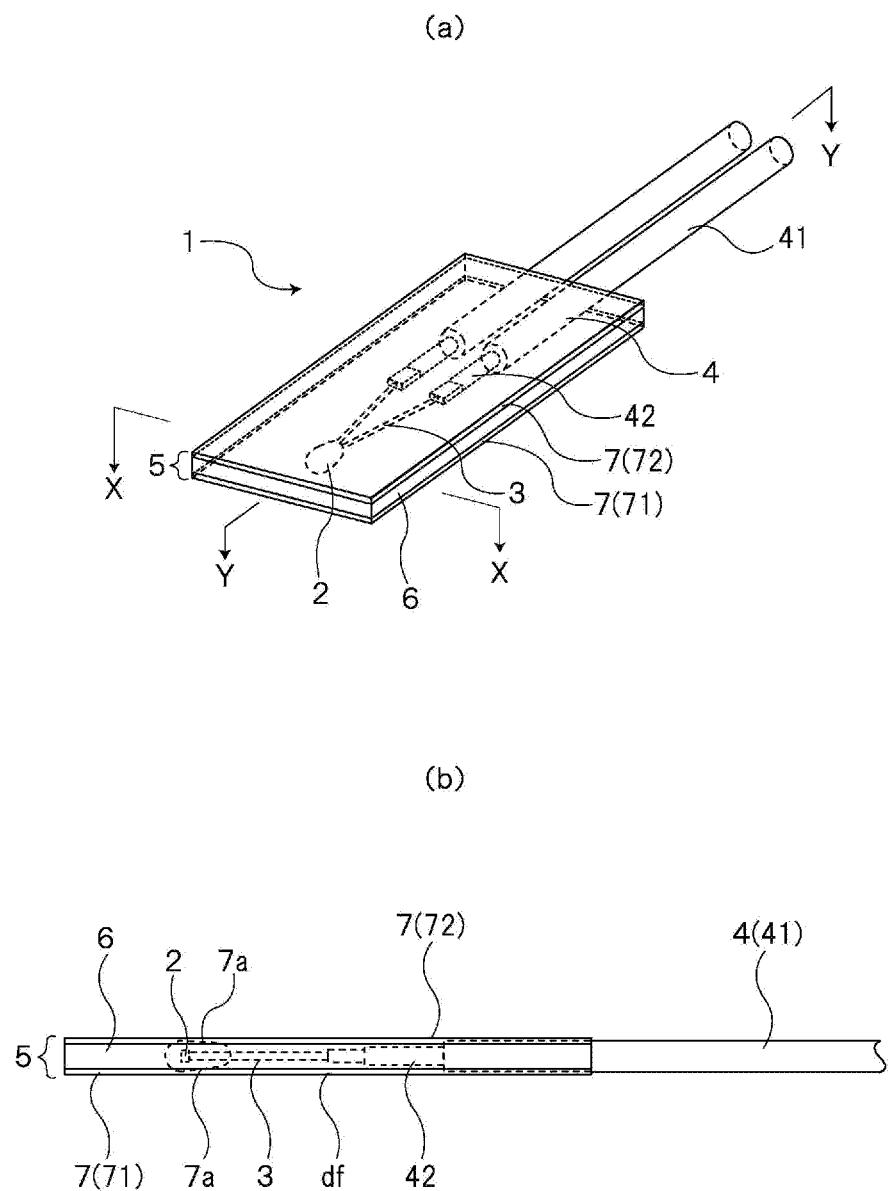
Figure 2:
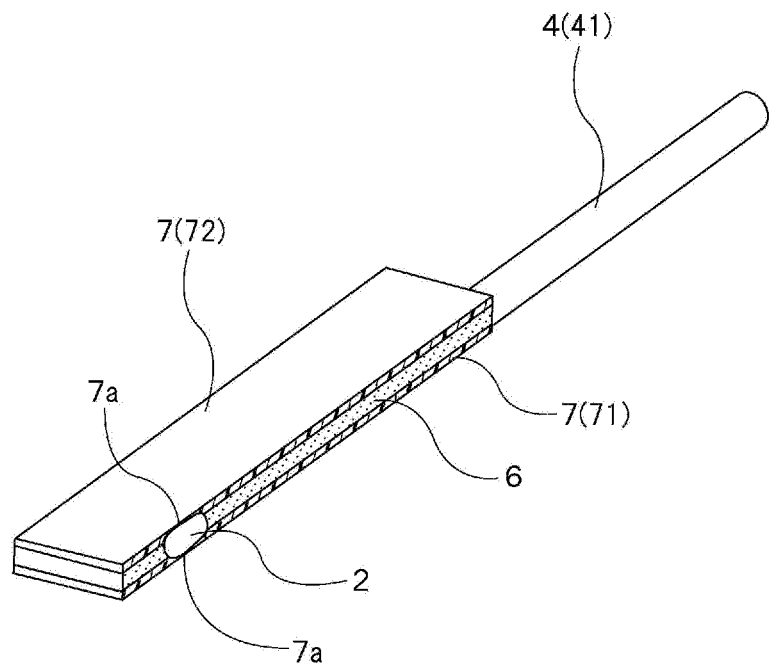
FIG. 2 is a cross-sectional view taken along the line Y-Y in (a) of FIG. 1.
Figure 3:
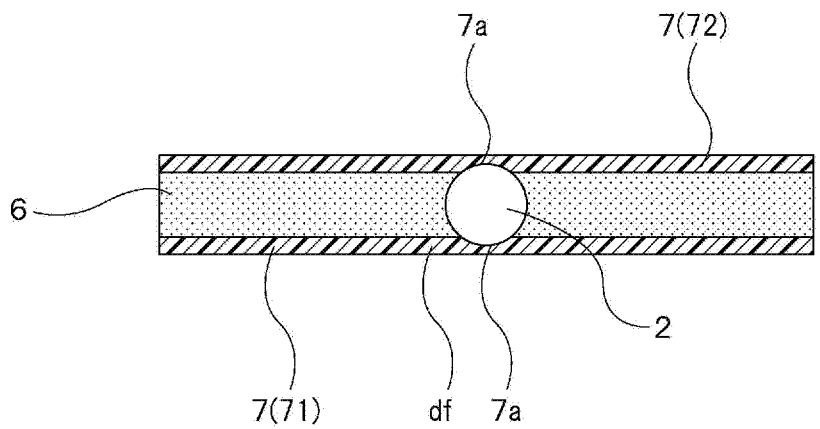
FIG. 3 is a cross-sectional view taken along the line X-X in (a) of FIG. 1.
Figure 4:
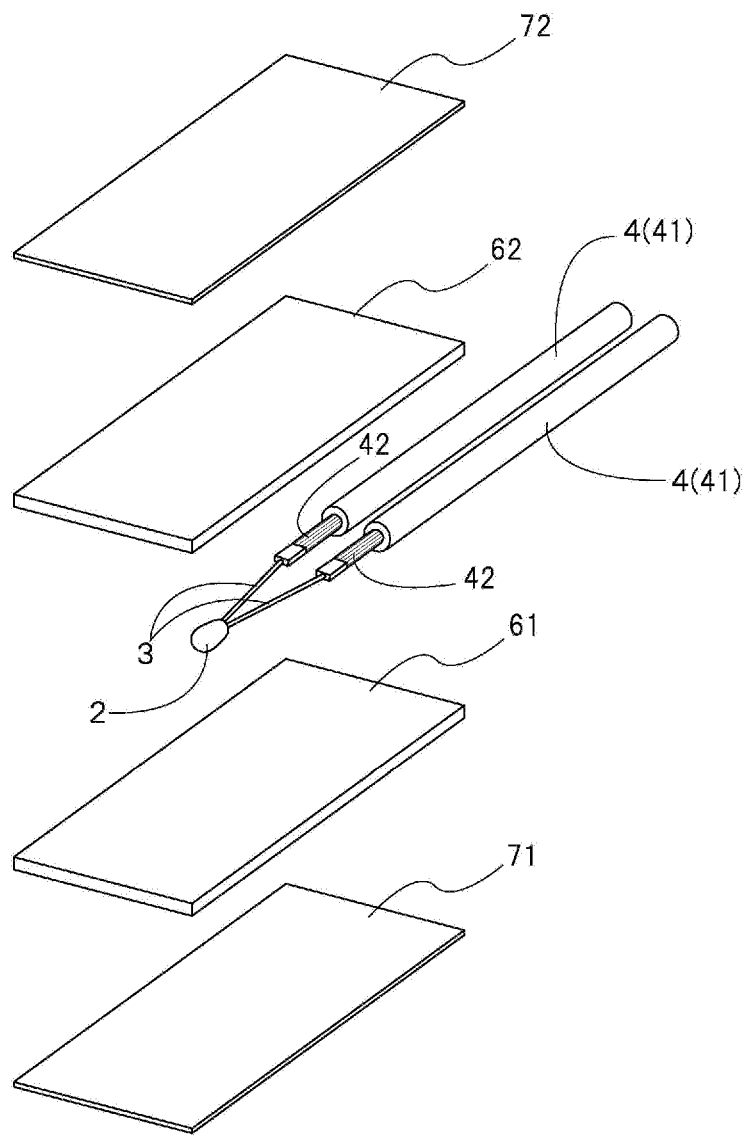
FIG. 4 is a perspective view showing members to be prepared in a manufacturing method of the temperature sensor.

Hereinafter, a temperature sensor according to a first embodiment of the disclosure will be described with reference to FIG. 1 to FIG. 5. FIG. 1 to FIG. 3 show the temperature sensor, and FIG. 4 and FIG. 5 show a state in which the temperature sensor is disposed on an object whose temperature is to be measured. Further, in each of the drawings, the same or equivalent parts are denoted by the same reference numerals, and repeated descriptions will be omitted. In each drawing, the scale of each member is appropriately changed in order to present each member in a recognizable size.

As shown in (a) and (b) of FIG. 1 to FIG. 3, a temperature sensor 1 includes a thermistor element 2, a lead-out wire 3, a lead wire 4, and a coating layer 5.

The thermistor element 2 is a temperature-sensitive sintering of a thermistor sintered body, and includes two or more elements selected from transition metal elements such as manganese (Mn), nickel (Ni), cobalt (Co), iron (Fe), yttrium (Y), chromium (Cr), copper (Cu), and zinc (Zn), and is made of an oxide thermistor material including a composite metal oxide having a crystal structure as a main component. Further, the thermistor element 2 may include an auxiliary component for improving characteristics and the like. The composition and content of the main component and the auxiliary component may be appropriately determined according to desired characteristics.

Further, the thermistor element 2 is covered by a sealing material such as glass. In this way, even when the temperature sensor 1 is used in a high temperature environment, the thermistor element 2 can be effectively protected.

The lead-out wire 3 has conductivity and is electrically connected, through welding or soldering, to electrodes such as gold, silver, copper, and platinum formed on a surface of the thermistor element 2, and is led out of the sealing material such as glass. The lead-out wire 3 is formed by a single conductive wire, and a material thereof is preferably a dumet or 42 alloy. The material of the lead-out wire 3 may include copper (Cu), iron (Fe), chromium (Cr), nickel (Ni), aluminum (Al), zinc (Zn), titanium (Ti), or an alloy including at least one of the foregoing materials.

The lead-out wire 3 is electrically connected to the lead wire 4. The lead wire 4 is an electric wire formed by a stranded wire covered by an insulating coating 41, and each core wire 42 thereof is electrically connected to the lead-out wire 3 by soldering, welding, crimping or the like. Therefore, a connection part is formed by the connection between the lead-out wire 3 and the lead wire 4. In addition, any one of a single wire, a square wire, a stranded wire, and the like may be applied as a form of the lead wire.

Further, forms of the thermistor element 2 may include a chip thermistor and a thin film thermistor electrically connected to the lead wire 4.

The coating layer 5 covers the thermistor element 2, the lead-out wire 3, and the connection part between the lead-out wire 3 and the lead wire 4 and protects them from the surrounding environment. The coating layer 5 is made of a resin material, such as a fluororesin, and includes an inner layer 6 and outer layers 7.

Specifically, the inner layer 6 is made of fluororesin FEP (a fluororesin obtained by jointly combining tetrafluoroethylene and hexafluoropropylene), and the thermistor element 2 and the like are coated by the FEP in a melted and then solidified state.

As will be described in a manufacturing method of the temperature sensor 1 described later, the inner layer 6 is formed by heating, melting and solidifying a pair of sheet-like resin materials (a first inner layer material 61 and a second inner layer material 62). The sheet-like resin materials originally in a pair (two pieces) are melted and integrated into a single layer. The thickness of the inner layer 6 is about 1 mm to 1.25 mm.

The outer layers 7 are formed of a pair of sheet-like resin materials, such as fluororesin PTFE (tetrafluoroethylene), and includes a first outer layer material 71 and a second outer layer material 72. The first outer layer material 71 and the second outer layer material 72 each have a substantially rectangular shape and a flat surface, and have a length of about 22 mm, a width of about 6.6 mm, and a thickness of about 0.25 mm.

Therefore, while the thickness of the inner layer 6 is about 1 mm to 1.25 mm, the thickness of the outer layers 7 is 0.25 mm×2 (pieces)=0.5 mm, and the thickness of the inner layer 6 is greater than the thickness of the outer layers 7.

In the above configuration, the thermistor element 2, the lead-out wire 3, and the connection part between the lead-out wire 3 and the lead wire 4 covered by the inner layer 6 are further covered by the outer layers 7. Further, the lead wire 4 is exposed from one end side of the coating layer 5 and led out for connection to a temperature-measuring circuit (not shown). Therefore, the temperature of the object whose temperature is to be measured can be detected by the temperature-measuring circuit based on the change in the resistance value of the thermistor element 2.

Specifically, the thermistor element 2 and the like are covered by the inner layer 6 and are also sandwiched between and covered by the pair of outer layers 7. In this case, since the coating layer 5 is formed by a pressing process and a heating process (as described later), as shown in FIG. 3, a plurality of recesses 7a are formed on the inner surface side of the outer layers 7 (the first outer layer material 71 and the second outer layer material 72). That is, the recesses 7a are formed to be deformed corresponding to the thermistor element 2 for the thermistor element 2 to sink into the inner surface side of the outer layers 7 so as to absorb its thickness in the thickness range of the thermistor element 2. Therefore, the thickness of the temperature sensor 1 is reduced, and the surfaces of the outer layers 7 remain flat.

In addition, the part of the thermistor element 2 sinking into the inner surface side of the outer layers 7, more precisely, the part of the sealing material such as glass is not completely covered by the inner layer 6 but is mainly covered by the outer layers 7.

Further, the temperature sensor 1 has flexibility and may be bent into a curved-surface shape. Incidentally, the thickness of the temperature sensor 1 may be formed to be about 1.5 mm.

Next, an example of a manufacturing method of the temperature sensor 1 will be described with reference to FIG. 4 and (a) to (d) of FIG. 5. The temperature sensor 1 is formed by sandwiching the thermistor element 2 between a pair of sheet-like inner layer materials and a pair of sheet-like outer layer materials, performing a pressing process and a heating process, and covering the thermistor element 2 by the inner layer materials and the outer layer materials.

As shown in FIG. 4, prepared are the thermistor element 2 to which the lead-out wire 3 and the lead wire 4 are connected, a sheet-like first inner layer material 61 and a sheet-like second inner layer material 62 as the pair of inner layer materials, and a sheet-like first outer layer material 71 and a sheet-like second outer layer material 72 as the pair of outer layer materials.

The pair of inner layer materials and the pair of outer layer materials have substantially the same shape, and have a rectangular shape and a flat surface. The thickness of each inner layer material (the first inner layer material 61 and the second inner layer material 62) is 0.5 mm, and the thickness of each outer layer material (the first outer layer material 71 and the second outer layer material 72) is 0.25 mm as described above. Further, the inner layer materials and the outer layer materials are thermoplastic resins. The inner layer materials are made of fluororesin FEP, and the outer layer materials are made of fluororesin PTFE.

The melting point of FEP of the inner layer materials is 275° C., and the melting point of PTFE of the outer layer materials is 327° C. Therefore, the outer layer materials have a higher melting point than the inner layer materials. Further, both the inner layer materials and the outer layer materials have good heat resistance and can withstand temperatures of 200° C. or more. In particular, PTFE can withstand long-term use over a wide temperature range of −100° C. to +260° C.

As shown in (a) to (d) of FIG. 5, the temperature sensor 1 is manufactured through a pressing process and a heating process by press processing using a mold. First, as shown in (a) of FIG. 5, the first outer layer material 71 is disposed on a lower mold 10 of a mold having a flat surface, and the first inner layer material 61 is stacked and disposed thereon, and the thermistor element 2 is further disposed thereon. Next, as shown in (b) of FIG. 5, the second inner layer material 62 and the second outer layer material 72 are disposed on the thermistor element 2. Therefore, the thermistor element 2 is disposed to be sandwiched between the inner layer materials and the outer layer materials. Subsequent to this disposition process, as shown in (c) and (d) of FIG. 5, the inner layer materials, the outer layer materials, and the thermistor element 2 disposed on the lower mold 10 having a flat surface are pressed and processed by an upper mold 11 of the mold having a flat surface (the pressing process).

In addition, the inner layer materials and the outer layer materials that are the coating layer 5 are heated together with the pressing process (the heating process). The heating temperature in this heating process is set to a temperature equal to or greater than the melting point of the FEP of the inner layer materials, and the temperature sensor 1 is manufactured.

In addition, the heating process may be performed before the pressing process or at the same time as the pressing process, and the order of the processes is not particularly limited. In the case where the heating process is performed before the pressing process, the pressing process is performed while the inner layer materials are being melting.

The temperature sensor 1 manufactured by the above-described manufacturing process by pressing and heating is in a sheet shape having a small thickness, and the surface of the outer layers 7 is formed to be flat. More specifically, in a state in which the thermistor element 2 is sandwiched between the first inner layer material 61 and the first outer layer material 71 and the second inner layer material 62 and the second outer layer material 72, the inner layer materials (the first inner layer material 61 and the second inner layer material 62) are melted and integrated into a single layer, and the thermistor element 2 are covered by the inner layer materials and the outer layer materials.

In this case, since the thermistor element 2 is sandwiched between the sheet-like inner layer materials and outer layer materials, a periphery between the first inner layer material 61 and the first outer layer material 71 and the second inner layer material 62 and the second outer layer material 72 is open without any members (for example, see (c) of FIG. 5). Therefore, according to the embodiment, it is possible to reduce the thickness as compared with the conventional temperature sensor formed of a double tube including an inner layer tube and an outer layer tube.

Further, the pressing pressure and the heating temperature are appropriately adjusted for the temperature sensor 1 manufactured through the pressing process and the heating process. Therefore, the recesses 7a that are deformed corresponding to the thermistor elements 2 are formed on the inner surface side of the first outer layer material 71 and the second outer layer material 72 by the pressure and heat, as described above. The recesses 7a are a clearance part to absorb the thickness for the thermistor element 2 to sink into the inner surface side of the first outer layer material 71 and the second outer layer material 72, whereby while the thickness of the temperature sensor 1 is reduced, the surface of the outer layers 7 can be made flat.

According to the temperature sensor 1, it can have durability, reduce thickness, have the outer layers 7 whose surface can be flat, ensure a large area, increase the contact area with the object whose temperature is to be measured, and improve measurement accuracy.

In addition, a thermosetting resin material may be used as the inner layer materials. In this case, the inner layer materials are cured by heating. That is, the thermosetting resin is caused to flow by the heating process and then cures to cover the thermistor element 2 and the like.

Further, the first inner layer material 61 and the second inner layer material 62, which are a pair of sheet-like resin materials, preferably have the same shape to be able to share common members. However, it is not necessary for them to always have the same shape, and the shapes may be different. In addition, similarly, the first outer layer material 71 and the second outer layer material 72, which are a pair of sheet-like resin materials, preferably have the same shape, but it is not necessary for them to always have the same shape.

As shown in an example of (a) and (b) of FIG. 6 and (a) and (b) of FIG. 7, the temperature sensor 1 is attached to a target whose temperature is to be measured 100 which is an object whose temperature is to be measured, and performs temperature detection. The target whose temperature is to be measured 100 is a heat source, and a surface of the temperature sensor 1 is brought into contact with a flat part of the heat source to perform temperature detection. In this example, the first outer layer material 71 side is used as a temperature detection surface df and is brought into contact with the target whose temperature is to be measured 100. In addition, the temperature detection surface df may be on the second outer layer material 72 side. This is because both the first outer layer material 71 and the second outer layer material 72 are similarly formed in a flat shape. Both surfaces of the first outer layer material 71 and the second outer layer material 72 may function as the temperature detection surface df.

As shown in the figures, the temperature sensor 1 is thin, and the temperature detection surface df is flat, and the temperature sensor 1 can be brought into contact with the target whose temperature is to be measured 100 with a large contact area. Therefore, heat from the target 100 whose temperature is to be measured is well transmitted to the temperature sensor 1, and the thermal response is fast, and improvement in measurement accuracy can be expected.

Next, results of confirming the temperature measurement performance of the above embodiment will be described with reference to FIG. 8 to FIG. 10. The temperature measurement performance is indicated by a detection temperature of a temperature sensor with respect to the target whose temperature is to be measured (heat source) 100. The temperature-measuring target samples are temperature sensors of the embodiments and temperature sensors of comparative examples.

As schematically shown in a transverse section in FIG. 8, the temperature sensors of the comparative examples are those of No. 1 Comparative Example 1 and No. 2 Comparative Example 2 as the temperature-measuring target samples, and the temperature sensors of the embodiments are those of No. 3 Embodiment 1 and No. 4 Embodiment 2 as the temperature-measuring target samples.

No. 1 Comparative Example 1 and No. 2 Comparative Example 2 are the types shown in the above-mentioned Patent Document 1, and are temperature sensors formed of a double contracted tube including an inner layer tube and an outer layer tube, and having a circular columnar shape and a square columnar shape in appearance. The thickness of No. 1 Comparative Example 1 is 2.1 mm; the thickness of No. 2 Comparative Example 2 is 1.7 mm, and the width is 3.5 mm. In addition, the thickness of No. 3 Embodiment 1 is 1.5 mm and the width is 6.6 mm; the size of No. 4 Embodiment 2 is same as that of No. 3 Embodiment 1, and a material that reflects infrared rays is disposed on the surface opposite to the temperature detection surface, and specifically, an aluminum tape is disposed for coverage. The effect of insulating radiation heat can be expected by coverage of the aluminum tape.

FIG. 9 shows the temperature measurement results, in which the horizontal axis represents time [sec] and the vertical axis represents temperature [° C.]. It shows the detection temperature of the temperature sensors which are the temperature-measuring target samples with respect to the temperature of the target whose temperature is to be measured (heat source).

It can be seen that the temperature sensors of No. 3 Embodiment 1 and No. 4 Embodiment 2 have good followability to the target whose temperature is to be measured (heat source), have a fast thermal response in a transient state within about 300 seconds from the start of measurement, and perform stable temperature detection substantially in parallel with the target whose temperature is to be measured in a steady state after about 300 seconds from the start of measurement.

FIG. 10 shows the temperature difference between the temperature sensors which are the temperature-measuring target samples and the target whose temperature is to be measured (heat source). In addition, the horizontal axis represents time [sec], and the vertical axis represents temperature difference [° C.]. From the data shown in FIG. 10, it can be confirmed that compared with the case of the temperature sensors of No. 1 Comparative Example 1 and No. 2 Comparative Example 2, the temperature difference in the case of the temperature sensors of No. 3 Embodiment 1 and No. 4 Embodiment 2 is smaller, and the temperature of the target whose temperature is to be measured (heat source) can be more accurately measured.

In addition, it can be seen that between the temperature sensors of No. 3 Embodiment 1 and No. 4 Embodiment 2, in the initial period of about 100 seconds from the start of measurement, the temperature difference is smaller and the followability in the transient state is also better in No. 4 Embodiment 2. In the subsequent steady state, results show that both embodiments perform good temperature detection. An effect of improving the controllability of temperature management of the target whose temperature is to be measured (heat source) is achieved by improving the transient characteristics.

Further, in addition to the size relation of the thermistor element 2 and the coating layer 5, it has been confirmed that the temperature measurement performance is improved by making the width of the sheet-like coating layer 5 (the inner layer 6 and the outer layers 7) 5 times or more of the size of the outer diameter of the glass sealing material that seals the thermistor element 2.

Next, a temperature sensor according to a second embodiment will be described with reference to (a) and (b) of FIG. 11 to (a) and (b) of FIG. 13. (a) and (b) of FIG. 11 shows a temperature sensor, and (a) and (b) of FIG. 12 and (a) and (b) of FIG. 13 show a state in which the temperature sensor is disposed on an object whose temperature is to be measured. Further, in each of the drawings, parts that are the same as or equivalent to those of the first embodiment are denoted by the same reference numerals, and repeated descriptions will be omitted.

The basic configuration of the temperature sensor 1 of this embodiment is the same as that of the first embodiment. In this embodiment, the temperature sensor 1 is formed by bending it into a flat curved-surface shape. Specifically, the temperature detection surface df is formed to conform to the curved-surface shape of the target whose temperature is to be measured 100 which is the object whose temperature is to be measured. Further, the curved-surface shape of the temperature sensor 1 is a curved-surface shape curved in the lead-out direction of the lead wire 4, and is formed to have one surface in a flat concave curved-surface shape on the temperature detection surface df side (the first outer layer material 71 side) and the opposite-side surface in a flat convex curved-surface shape on the second outer layer material 72 side.

Therefore, the temperature detection surface df can be brought into close contact along the shape of the surface of the target whose temperature is to be measured 100, whereby the measurement accuracy can be improved.

In manufacturing the temperature sensor 1 of the embodiment, as in the first embodiment, prepared are the thermistor element 2 to which the lead-out wire 3 and the lead wire 4 are connected, the sheet-like first inner layer material 61 and the sheet-like second inner layer material 62 as the pair of inner layer materials, and the sheet-like first outer layer material 71 and the sheet-like second outer layer material 72 as the pair of outer layer materials. A pressing process and a heating process are applied, and a mold having curved-shape surfaces (pressing surfaces) is used. For example, a mold is used in which the surface of the lower mold is a convex curved-surface shape, and the surface of the upper mold facing the surface of the lower mold is a concave curved-surface shape. In this way, the temperature sensor 1 is formed in a curved-surface shape.

As described above, according to the embodiment, the temperature detection surface df of the temperature sensor 1 can be manufactured by changing the curvature in accordance with the shape of the target whose temperature is to be measured 100. Therefore, in addition to the effects of the first embodiment, the temperature sensor 1 of this embodiment is suitably used, for example, in the case of detecting the temperature of a motor coil of a traveling motor that is a core component of an electric vehicle or a hybrid vehicle.

Since the motor coil generally has a substantially circular cylindrical appearance, the temperature detection surface df is formed in a curved-surface shape in accordance with the shape of the motor coil, whereby the temperature detection surface df can be securely brought into contact with the motor coil side, and measurement accuracy can be improved.

Since the motor coil is cooled by oil such as automatic transmission fluid, the sensors are required to have oil resistance. Therefore, it is necessary to select a material having oil resistance at a high temperature of 150° C. or more for the outer layer materials and the inner layer materials.

Examples of the oil-resistant sheet-like materials include PTFE, PPS, PEEK, polyimide, and glass epoxy. Further, PFA, FEP and the like are used as materials of thermoplastic resins, and an epoxy resin is generally used as a material of thermosetting resins. The temperature sensor 1 is formed by appropriately combining these materials to form the inner layer and the outer layers.

Further, in the embodiment, the case where the temperature sensor 1 is formed into a curved-surface shape has been described. However, when the flat temperature sensor 1 of the first embodiment is attached to the target whose temperature is to be measured 100, the temperature sensor 1 may be bent in a curved-surface shape in accordance with the shape of the target whose temperature is to be measured 100 for attachment. Since the temperature sensor 1 has a predetermined flexibility, it can be bent in a curved-surface shape.

Next, an embodiment will be described with reference to (a) to (c) of FIG. 14 in which the temperature sensor 1 according to each of the above embodiments has an attachment part for attaching the temperature sensor 1 to the target whose temperature is to be measured 100 which is the object whose temperature is to be measured. The attachment part in this embodiment is formed on the coating layer 5.

(Example 1)

As shown in (a) of FIG. 14, a pair of notches are formed as attachment parts 5a at two end sides in the width direction of the coating layer 5 in the temperature sensor 1. Therefore, for example, it is possible to perform positioning and attachment by fitting the notches to bosses or the like formed on the target whose temperature is to be measured 100.

(Example 2)

As shown in (b) of FIG. 14, a pair of outwardly directed protrusions are formed as attachment parts 5b at two ends in the width direction on the rear end side of the coating layer 5 in the temperature sensor 1.

(Example 3)

As shown in (c) of FIG. 14, a pair of holes are formed as attachment parts 5c at two end sides in the width direction of the coating layer 5 in the temperature sensor 1.

According to each of the above examples, it is possible to attach the temperature sensor 1 to the target whose temperature is to be measured 100 which is the object whose temperature is to be measured by using the attachment part.

Further, the above-described temperature sensor 1 can be provided and applied to various devices for detecting the temperature of an electric appliance such as an air conditioner, a refrigerator, a water heater, and an IH cooking heater, and for detecting the temperature of a motor coil, a secondary battery and the like of a vehicle-mounted device of an automobile and the like. Applicable devices are not particularly limited.

Further, the disclosure is not limited to the configurations of the above embodiments, and various modifications can be made without departing from the spirit of the disclosure. Further, the above-described embodiments have been presented as examples, and are not intended to limit the scope of the disclosure. New embodiments can be implemented in other various forms, and various omissions, replacements, and changes can be made. Such embodiments and their modifications are included in the scope and spirit of the disclosure, and are also included in the disclosure described in the claims and their equivalents.

What is claimed is:

1. A temperature sensor comprising:
    a thermistor element;
    a lead-out wire connected to the thermistor element;
    a lead wire connected to the lead-out wire;
    an inner layer formed by heating and curing or by melting and solidifying a pair of sheet-like inner layer materials made of a resin material; and
    outer layers formed by a pair of sheet-like outer layer materials made of a resin material and having flat surfaces on two sides,
        wherein the thermistor element, the lead-out wire, and a connection part between the lead-out wire and the lead wire are covered by the inner layer and are covered by the pair of outer layers by being sandwiched therebetween,
    the thermistor element is not completely covered by the inner layer, and
    an inner surface side of the outer layers is deformed to form a recess corresponding to the thermistor element, wherein the recess is a clearance part to absorb a thickness for the thermistor element to sink into the inner surface side of the outer layers.

2. The temperature sensor according to claim 1, wherein a material that reflects infrared rays is disposed on one surface of the outer layers.

3. The temperature sensor according to claim 1, wherein the outer layers are in a curved-surface shape, one surface is in a concave curved-surface shape, and the other surface is in a convex curved-surface shape.

4. The temperature sensor according to claim 1, wherein the temperature sensor has flexibility.

5. The temperature sensor according to claim 1, wherein the lead wire is an electric wire covered by an insulating coating.

6. The temperature sensor according to claim 1, wherein the outer layers and the inner layer have heat resistance of 200° C. or more.

7. The temperature sensor according to claim 1, wherein the outer layers and the inner layer have oil resistance of 150° C. or more.

8. The temperature sensor according to claim 1, wherein the pair of sheet-like outer layer materials made of the resin material have an identical shape.

9. The temperature sensor according to claim 1, wherein a thickness of the inner layer is greater than a thickness of the outer layer.

10. A device including a temperature sensor, comprising the temperature sensor according to claim 1.

* * * * *